US 6,618,175 B1

(12) United States Patent
Shirakura

(10) Patent No.: US 6,618,175 B1
(45) Date of Patent: Sep. 9, 2003

(54) HOLOGRAPHIC STEREOGRAM PREPARATION APPARATUS

(75) Inventor: Akira Shirakura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/519,622

(22) Filed: Mar. 6, 2000

(51) Int. Cl.[7] .............................. G03H 1/26; G03H 1/00
(52) U.S. Cl. ............................ 359/35; 359/23; 359/30
(58) Field of Search ............................ 359/1, 35, 23, 359/24, 30; 353/31; 369/75.1

(56) References Cited

U.S. PATENT DOCUMENTS

| | | | | |
|---|---|---|---|---|
| 4,222,669 A | * | 9/1980 | Frosch et al. | 356/360 |
| 5,144,461 A | * | 9/1992 | Horan | 359/35 |
| 5,223,955 A | * | 6/1993 | Zabka | 359/35 |
| 5,493,457 A | * | 2/1996 | Kawamura et al. | 369/75.1 |
| 5,528,390 A | * | 6/1996 | Goto et al. | 359/35 |
| 5,745,623 A | * | 4/1998 | Ohtomo et al. | 385/88 |
| 5,820,242 A | * | 10/1998 | Rodriguez et al. | 353/119 |
| 5,951,136 A | * | 9/1999 | Furuhata et al. | 353/31 |

FOREIGN PATENT DOCUMENTS

JP         11084676 A  *  3/1999

* cited by examiner

Primary Examiner—Audrey Chang
(74) Attorney, Agent, or Firm—Rader, Fishman & Grauer PLLC; Ronald P. Kananen, Esq.

(57) ABSTRACT

A bright holographic stereograin having a high diffraction efficiency can be prepared by restricting vibrations. The apparatus comprises: an optical system 15 for letting an objective laser L2 beam subjected to image-modulation based on each image of a parallax image sequence and a reference laser L3 beam having coherence with respect to the objective laser beam L2 enter into a recording medium 3 and for recording interference fringes generated by the objective laser beam L2 and the reference laser beam L3, as a hologram element, onto the recording medium 3; an anti-vibration support means 19 for supporting the optical system 15 on a casing 20 while preventing vibrations; and cooling means 48 to 52 for cooling the optical system 15. The cooling means is constructed by drive sections 48 and 49 whose vibrations are prevented from being transferred to the optical system 15 by providing the cooling means in the casing side, and ducts 50, 51, and 52 made of non-rigid materials connecting the drive sections 48 and 49 with the optical system 15, and the objective and reference laser beams L2 and L3 kept in a stable state are let into the recording medium 3.

27 Claims, 6 Drawing Sheets

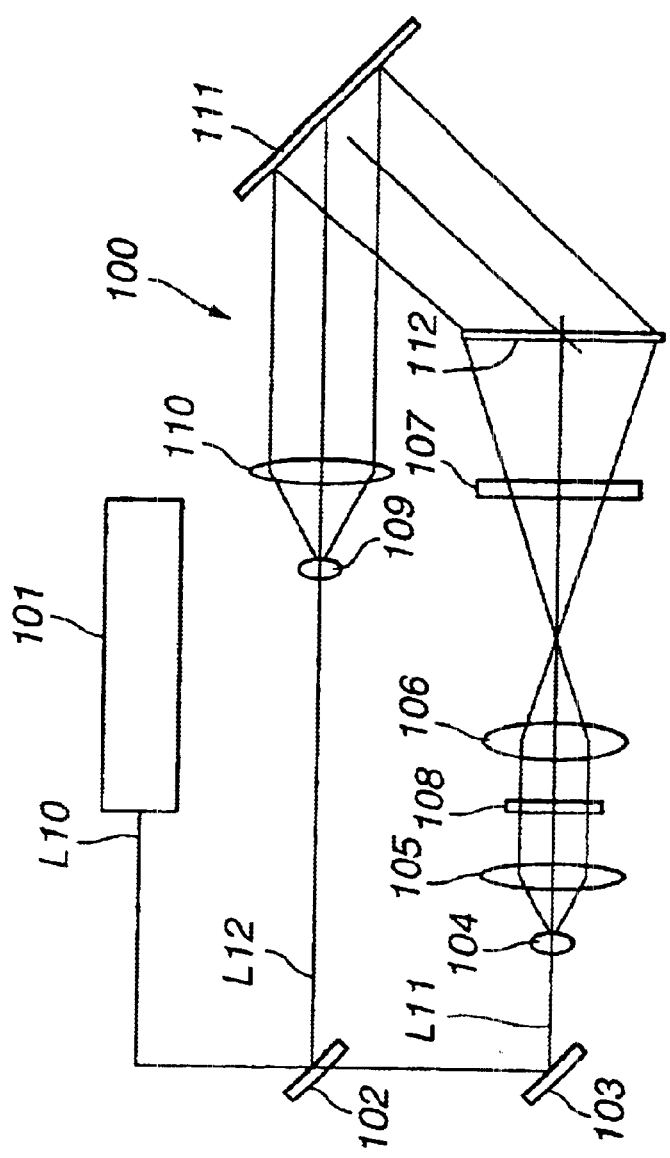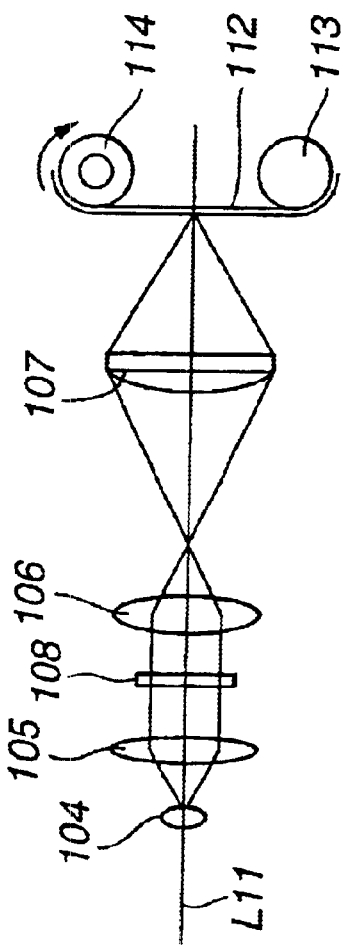
FIG.1A
PRIOR ART
FIG.1B
PRIOR ART

HOLOGRAPHIC STEREOGRAM PREPARATION APPARATUS

BACKGROUND OF THE INVENTION

The present invention relates to a holographic stereogram preparation apparatus capable of three-dimensionally recognizing an actually picked-up image, a computer-generated image, and the like.

A holographic stereogram is prepared as follows. An object is sequentially picked up from different observation points to obtain a number of images. These images, which are used as original images, are recorded sequentially as hologram elements in the form of strips or dots onto a piece of hologram recording medium. When a user looks at this holographic stereogram with only one eye from a certain position, the user discriminates a two-dimensional image as an aggregate of image information of a part of each hologram element. When the user looks at the holographic stereogram from another position shifted from the above-mentioned position, the user discriminates another two-dimensional image as an aggregate of image information of another part of each hologram element. Accordingly, when a user looks at a holographic stereogram with both eyes, a recorded image is recognized as a three-dimensional image.

In general, a holographic stereogram as described above is prepared by a holographic stereogram preparation apparatus 100 as shown in FIG. 1. The holographic stereogram preparation apparatus 100 comprises a laser light source 101 which emits a laser beam L10 having a single wavelength and excellent coherence, a half-mirror 102 which spectrally divides the laser beam L10, into an objective laser beam L11 and a reference laser beam L12, optical parts 103 to 107 and a display device 108 which construct an optical system for the objective laser beam L11, optical parts 109 to 111 which construct an optical system for the reference laser beam L12, a hologram recording medium 112 onto which the objective laser beam L11 and the reference laser beam L12 are converged, and the like.

The optical system for the objective laser beam L11 specifically comprises a total-reflection mirror 103, a first cylindrical lens 104 which diffuses the objective laserbeam L11 in a one-dimensional direction, a collimator lens 105 which parallelizes the diffused objective laser beam L11, a projective lens 106, a second cylindrical lens 107 which guides the objective laser beam L11 to the hologram recording medium 112, all arranged orderly along the optical axis from the input side. The display device 108 is constructed by a transmissible liquid crystal panel and is provided between the collimator lens 105 and the projective lens 106. An image based on image data outputted from an image processing section not shown is displayed on the display device 108.

The optical system for the reference laser beam L12 specifically comprises a cylindrical lens 109 which diffuses the reference laser beam L12 in a one-dimensional direction, a collimator lens 110 which parallelizes the diffused reference laser beam L12, and a total-reflection mirror 111 which reflects the reference laser beam L12 to guide this beam to the hologram recording medium 112. The hologram recording medium 112, for example, is made of a photosensitive film and is fed from a feed reel 113. Also, this medium is intermittently fed in accordance with an image displayed on the display device 108, by a feed mechanism omitted from the figure, and is then wound on a wind reel 114.

The laser beam L10 is emitted from the laser light source 101 and enters into the half-mirror 102. This beam is spectrally divided into an objective laser beam L11 and a reference laser beam L12 by the half-mirror 102. The objective laser beam L11 is let into the display device 108 by the cylindrical lens 104 and the collimator lens 105, and is subjected to image-modulation in accordance with the image displayed when the beam passes through the display device 108. The objective laser beam L11 thus subjected to image-modulation is let into the hologram recording medium 112 through the projective lens 106 and the cylindrical lens 107. Also, the reference laser beam L12 is let into the hologram recording medium 112 through the optical system consisting of the cylindrical lens 109, the collimator lens 110, and the total-reflection mirror 111.

Accordingly, a video displayed on the display device 108 is sequentially exposed and recorded in the form of strips or dots taking interference fringes caused by interference between the objective laser beam L11 subjected to image-modulation and the reference laser beam L12 as hologram elements.

Meanwhile, the holographic stereogram preparation apparatus 100 as described above has a problem that the holographic stereogram is affected if a vibration or the like is applied when each hologram element is exposed and recorded onto the hologram recording medium 112. Specifically, in the holographic stereograin preparation apparatus 100, the state of the interference fringe exposed and recorded becomes unstable, resulting in a phenomenon that the diffraction efficiency or the brightness is lowered at a part of the hologram element recorded and formed, even when a vibration equivalent to the wavelength of the laser beam L or so is applied. Also, if a much greater vibration or the like is applied in the holographic stereogram preparation apparatus 100, there appears a problem that hologram elements are not recorded or formed at all on the hologram recording medium 112.

If a holographic stereogram is recorded with a partial hologram element thereof recorded at a low diffraction efficiency as described above, only the hologram element becomes dark when the holographic stereogram is reproduced, and hence, the uniformness of the image is deteriorated.

Therefore, the holographic stereogram preparation apparatus 100 is additionally provided with an antivibration device which restricts a vibration or the like applied from outside and which quickly damps the applied vibration, in order that stabilized hologram elements are exposed and recorded onto the hologram recording medium 112. The antivibration device is constructed by an air damper a spring, or the like appropriately provided between a substrate mounting respective optical components forming the laser light source 101 and the optical system described above and the apparatus casing.

Meanwhile, in the holographic stereogram preparation apparatus 100, for example, a semniconductor excitation YAG laser, an air-cooled argon gas laser, an air-cooled krypton laser or the like is used as the laser light source 101. In the holographic stereogram preparation apparatus 100, since a laser head section of the laser device described above has a high temperature and makes bad influences on optical components and the like, an air-cooling device is additionally provided to perform cooling. The cooling device cools the laser head section, the heat sink member, and the like of the laser device by ventilation using a cooling fan. Accordingly, it is effective that the cooling device is provided at a position close to the laser device.

However, since the cooling fan of the cooling device rotates and operates during recording of hologram elements onto the hologram recording medium 112, the holographic stereogram preparation apparatus 100 becomes a vibration source so that the holographic stereogram preparation apparatus 100 is kept vibrated. Consequently, the holographic stereogram preparation apparatus 100 has a problem that the anti-vibration apparatus effectively operates with respect to a vibration and the like which are applied from outside but it is difficult to prepare a holographic stereogram with high precision due to influences from a vibration generated by an internal cooling device.

BRIEF SUMMARY OF THE INVENTION

The present invention, hence, has been proposed to provide a holographic stereogram which solves problems of the conventional holographic stereogram preparation apparatus as described above, carries out efficient cooling for its laser device and the like, reduces influences such as vibrations, and enables a highly precise holographic stereogram.

A holographic stereogram preparation apparatus according to the present invention which achieves the above object comprises: an optical system for letting an objective laser beam subjected to image-modulation based on each image of a parallax image sequence and a reference laser beam having coherence with respect to the objective laser beam enter into a recording medium, and for recording interference fringes generated by the objective laser beam and the reference laser beam, as a hologram element, onto the recording medium; anti-vibration means for supporting at least the optical system on a casing while preventing vibrations; and cooling means for cooling at least the optical system. The cooling means is constructed by a drive section whose vibrations are prevented from being transferred to the optical system by providing the cooling means in a side of the casing, and a duct made of a non-rigid material provided between the drive section and the optical system.

In the holographic stereograin preparation apparatus according to the present invention constructed as described above, the optical system is supported by an anti-vibration device while preventing vibrations, and therefore, interference fringes based on an objective laser beam and a reference laser beam are stabilized so that hologram elements are precisely exposed and recorded on a recording medium, even in a case where a vibration or the like is applied from the outside. Also, the holographic stereogram preparation apparatus cools the optical system by the cooling means, and therefore, increase of the temperature inside the apparatus is restricted. Further, in the holographic stereogram preparation apparatus, the cooling means is provided in the casing side, and an anti-vibration means is provided between the casing and the optical system. As a result of this, influences of vibrations generated by the cooling means onto the optical system are restricted so that interference fringes depending on the objective laser beam and the reference laser beam are stabilized. As a result, hologram elements are precisely exposed and recorded on the recording medium. Accordingly, the holographic stereogram preparation apparatus prepares a holographic stereogram of an image quality with high precision, which consists of bright and stable hologram elements having a high diffraction efficiency.

As has been specifically explained above, the holographic stereogram preparation apparatus according to the present invention comprises an anti-vibration support means for supporting at least an optical system on the casing while preventing vibrations and a cooling means for restricting at least the optical system to restrict increase of the temperature inside the apparatus. This cooling means is constructed by a drive section whose vibrations are prevented from being transferred to the optical system by providing this cooling means in the casing side, and a duct made of a non-rigid material provided between the drive section and the optical system. As a result of this, influences on the optical system can be securely restricted not only with respect to vibrations applied from outside but also with respect to internal vibrations generated from the drive section of the cooling means. Accordingly, the holographic stereogram preparation apparatus makes an objective laser beam and a reference laser beam stably enter into a recording medium, so that hologram elements consisting of interference fringes based on the objective and reference laser beams are exposed and recorded on the recording medium with the hologram elements stabilized. A bright holographic stereogram having a high diffraction factor can thus be prepared.

BRIEF DESCRIPTION OF THE SEVERAL VIEWS OF THE DRAWING

FIGS. 1(A) and 1(B) are views which schematically explain an optical system of a conventional holographic stereogram preparation apparatus.

FIG. is a view which schematically explain an optical system of the holographic stereogram preparation apparatus.

Figure 6:
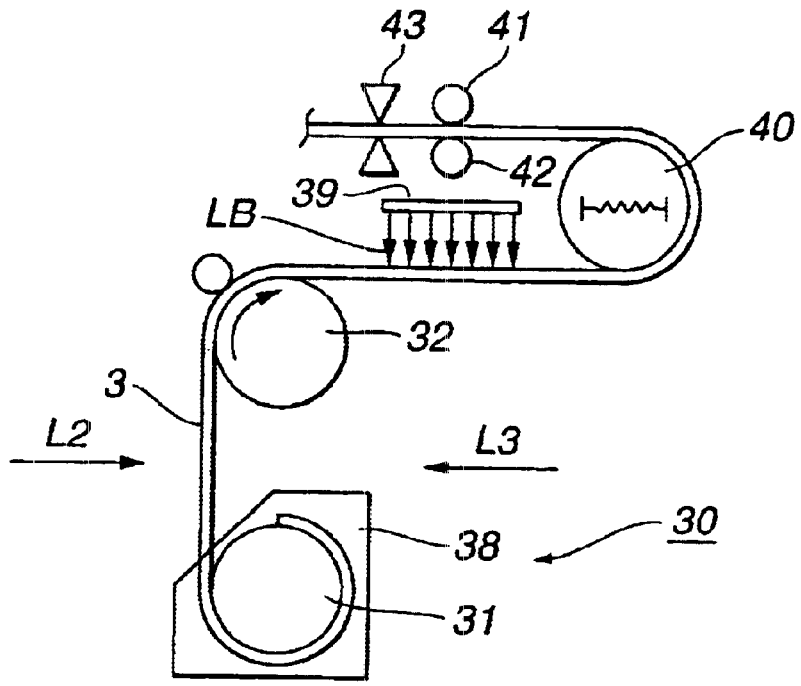

FIG. 6 is a view which schematically explains the structure of a recording medium feed mechanism comprised in the holographic stereogram preparation apparatus.

Figure 7:
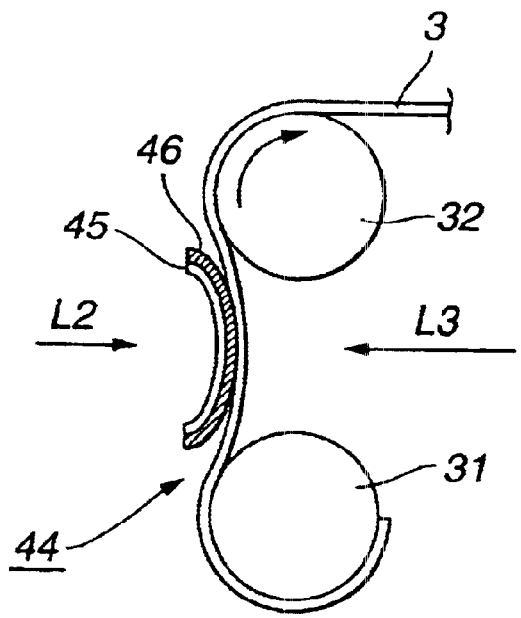

FIG. 7 is a view which schematically explains the structure of an exposing/recording section of the holographic stereogram.

Figure 8:
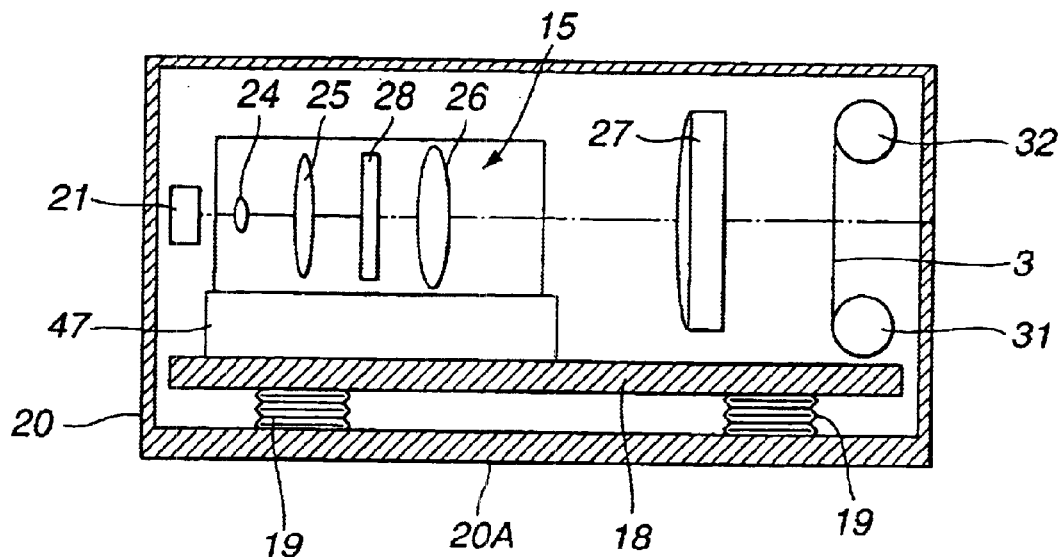

FIG. 8 is a schematic structural view showing the holographic stereogram preparation apparatus.

Figure 9:
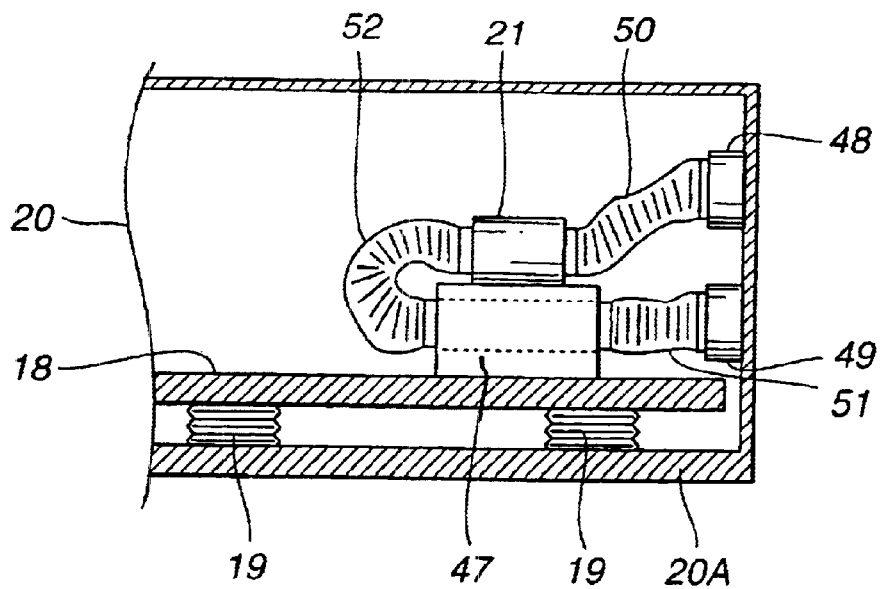

FIG. 9 is a view which explains the schematic structure of a cooling mechanism comprised in the holographic stereogram preparation apparatus.

DETAILED DESCRIPTION OF THE INVENTION

In the following, embodiments of the present invention will be explained in details with reference to the drawings. A holographic stereogram preparation apparatus 10 according to the embodiment is an apparatus for preparing a so-called one-step holographic stereogram in which interference fringes of an objective laser beam L2 and a reference laser beam L3 based on a number of strip-like holographic elements are directly recorded as a holographic stereogram onto a hologram recording medium 3. The hologram recording medium 3 is made of a photosensitive film, for example, and is intermittently driven by a recording medium feed mechanism 30 which will be described later.

Figure 2:
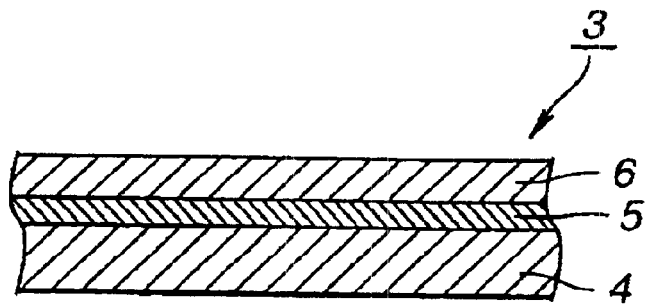
FIG. 2 is a cross-sectional view of a main part which explains a hologram recording medium used in the holographic stereogram preparation apparatus.
Figure 3A:
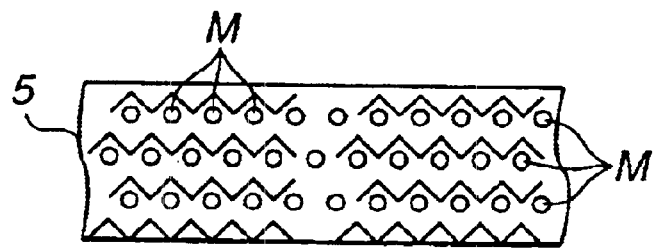
FIGS. 3(A), 3(B) and 3(C) are views which explain the exposure process of the hologram recording medium wherein FIGS. 3(A), 3(B), and 3(C) respectively show an initial state, an exposure state, and a fixing state.
Figure 3B:
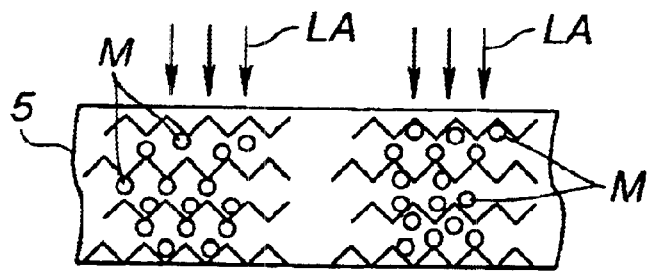
Figure 3C:
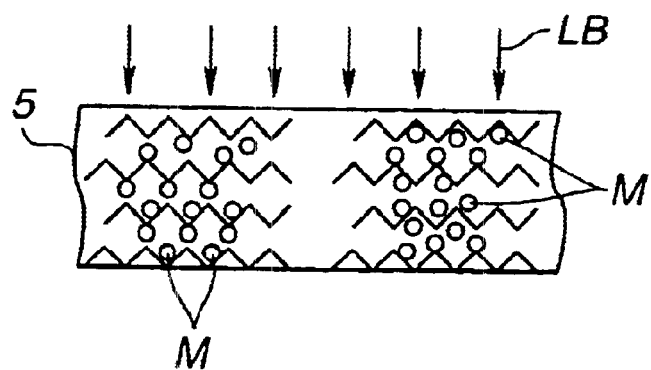

As shown in FIG. 2, the hologram recording medium 3 used for this holographic stereogram preparation apparatus 10 is a so-called film coating type recording medium in which a photopolymer layer 5 made of photopolymerization type photopolymer is formed on a tape-like film base material 4 and a cover sheet layer 6 is coated on the photopolymer layer 5. With respect to this hologram recording medium 3, recording principles of hologram elements will be explained with reference to FIG. 3. The hologram recording medium 3 is arranged in a state in which the photopolymerization type photopolymer forming the photopolymer layer 5 is arranged such that monomers M are dispersed uniformly in matrix polymer in an initial state, as shown in FIG. 3(A).

By irradiating a laser beam LA having a power of 10 mJ/cm$^2$ to 400 mJ/cm$^2$, the monomers M disposed uniformly in matrix polymer are polymerized into polymer within an exposed portion. The photopolymerization type photopolymer causes modulation on the refraction factor at the exposed portion and the non-exposed portion because the density of the monomers M becomes non-uniform due to movements of monomers M from the periphery. The photopolymerization type polymer completes polymerization of the monomers M in the matrix polymer by irradiating an ultraviolet beam or a visible beam LB onto the entire surface. The refraction factor of the photopolymerization type photopolymer forming the photopolymer layer 5 changes in accordance with the laser beam refraction factor rays, so that the hologram recording medium 3 records interference fringes caused by interference between the objective laser beam L2 and the reference laser beam L3, as a change of the refraction factor.

Since the holographic stereogram preparation apparatus uses a film coating type recording medium in which the photopolymer layer 5 is formed by photopolymerization type photopolymer described above, as the holograph recording medium 3, the step of performing any special development processing on the hologram recording medium 3 after exposure is not necessary. Accordingly, the structure of the holographic stereogram preparation apparatus 10 is simplified because a development device or the like is not necessary, and, thus, holographic stereograms can be rapidly prepared.

Figure 4:
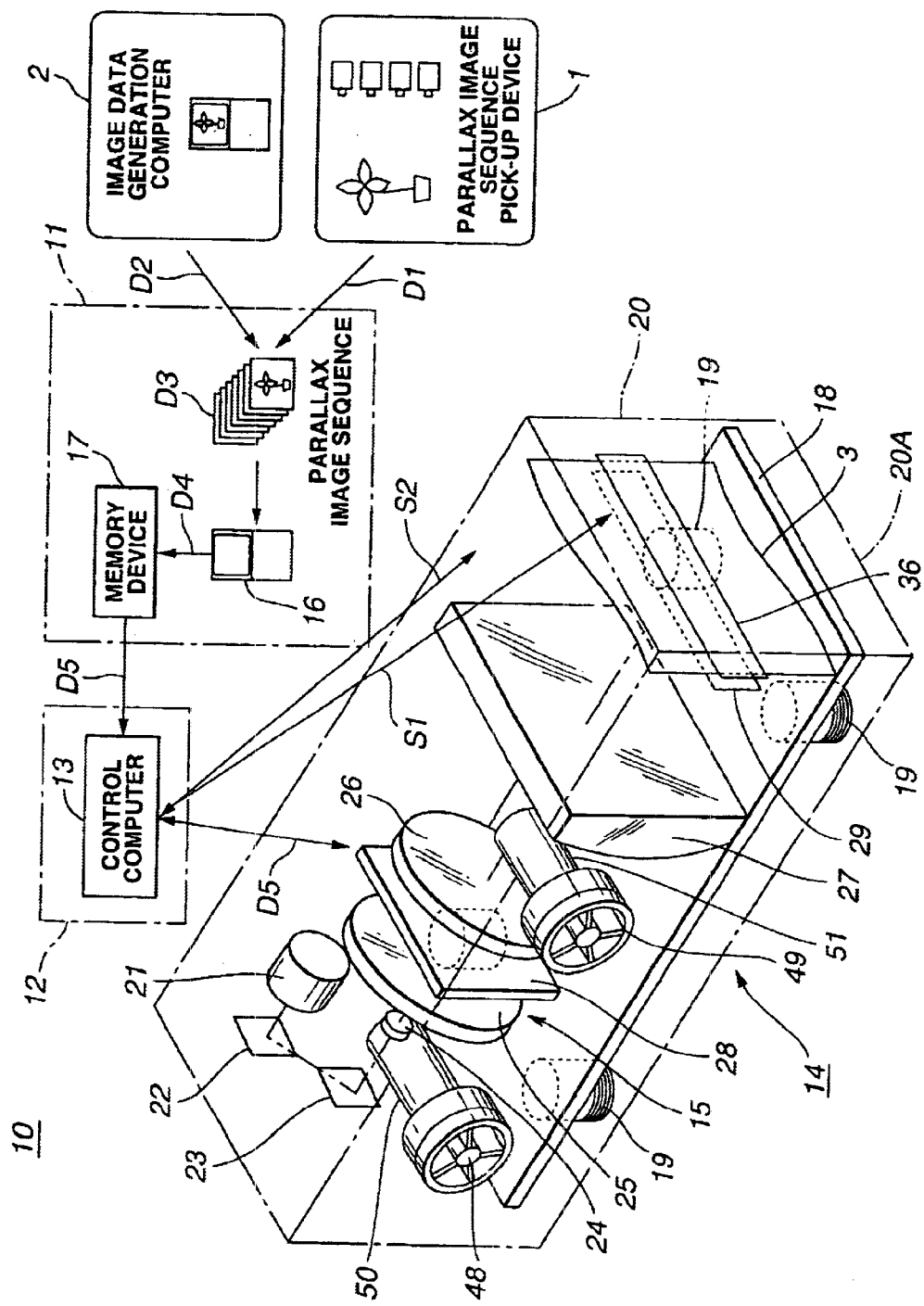
FIG. 4 is a view which schematically explains the entire structure of a holographic stereogram preparation apparatus.

As shown in FIG. 4, the holographic stereogram preparation apparatus 10 comprises an image data processing section 11, a control section 12 including a control computer 13 for controlling the entire apparatus, and a holographic stereogram preparation section 14 including an optical system for preparing a holographic stereogram. The image data processing section 11 comprises an image processing computer 16 and a memory device 17, and generates a parallax image data sequence D3 based on image data of hologram elements such as a number of picked-up image data pieces D1 containing parallax information supplied from a parallax image sequence pick-up device 1 comprising a multiple-lens camera, a movable camera, or the like, a number of computer image data pieces D2 containing parallax information generated by an image data generation computer 2, and the like.

The image data processing section 11 performs predetermined image processing for a holographic stereogram, on the parallax image data sequence D3, by means of the image processing computer 16, and temporarily stores the hologram image data D4 subjected to image processing, into the memory device 17 such as a memory or a hard disk device of a computer, or the like. Note that the picked-up image data D1 corresponds to a plurality of images obtained by picking up images by simultaneous picking-up based on a multiple-lens camera or sequential picking-up based on a movable camera, for example, and contains parallax information. Meanwhile, the computer image data D2 consists of a plurality of image data pieces which are prepared by a CAD (Computer Aided Design) apparatus or a CG (Computer Graphics) apparatus, for example, and which contain parallax information.

The image data processing section 11 reads orderly hologram element image data D5 for every image, from hologram image data D4 stored in the memory device 17, and sends these hologram element image data pieces D5 to the control computer 13 of the control section 12. The control computer 13 drives the holographic stereogram preparation section to record sequentially images based on the hologram element image data pieces D5 supplied from the data processing section 11, as strip-like hologram elements, onto the hologram recording medium 3 set in the holographic stereogram preparation section 14.

Figures 5A, 5B:
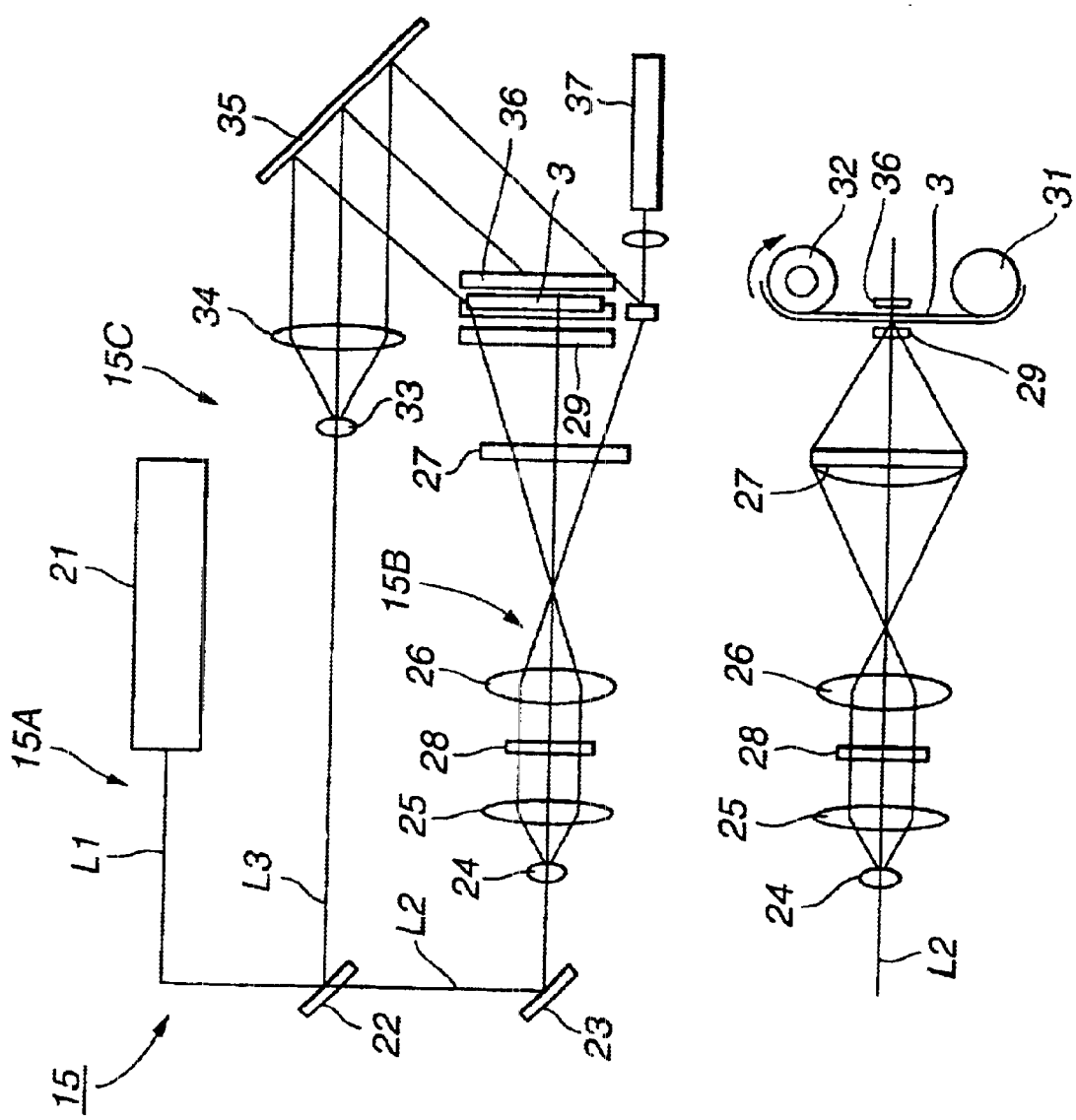

The control computer 2 controls operation of each mechanism of the holographic stereogram as will be described later. In the holographic stereogram preparation section 14, respective members constructing the optical system are provided and supported on a support board 18, and this support board 18 is supported on an apparatus casing 20 through a damper 19. As shown in FIGS. 4 and 5, the optical system 15 comprises an incidence laser optical system 15A, an objective laser optical system 15B, and a reference laser optical system 15C. The objective laser optical system 15B and the reference laser optical system 15C are constructed so as to have a substantially equal light path length. Note that the apparatus casing 20 is constructed in such a structure which guarantees shielding for the optical system 15.

The incidence laser optical system 15A comprises a laser light source 21 which emits a laser beam L1 and a half-mirror 22 which spectrally divides the laser beam L1. Note that the incidence laser optical system 15A may be provided with a total-reflection mirror and a shutter mechanism which appropriately refracts and reflects the laser beam L1 although not shown in the figures. The laser light source 21 is constructed, for example, by a laser device such as a semiconductor excitation YAG laser device which emits a laser beam L1 having one single wavelength and excellent coherence, an air-cooled argon gas laser device, an air-cooled krypton laser device, or the like. The half-mirror 22 spectrally divides the laser beam L1 thus inputted, into an objective laser beam L2 as a transmission component and a reference laser beam L3 as a reflection component.

The objective laser optical system 15B is specifically comprised of optical components such as a total-reflection mirror 23, a first cylindrical lens 24, a collimator lens 25, a projective lens 26, a second cylindrical lens 27, and the like which are arranged orderly along the optical axis from the input side. The first cylindrical lens 24 is constructed by combining a convex lens and a pin hole and diffuses an objective laser beam L2 which has been transmitted through the half-mirror 22 and refracted by the total-reflection mirror 23, in a one-dimensional direction corresponding to the display screen width of the liquid crystal display device 28 described later. The collimator lens 25 parallelizes and guides the objective laser beam L2 diffused by the first cylindrical lens 24 to the liquid crystal display device 28. The projective lens 26 projects the objective laser beam L2 onto the second cylindrical lens 27. The second cylindrical lens 27 operates to converge the parallelized objective laser beam L2 in the lateral direction.

The objective laser optical system 15B is provided with a transmission type liquid crystal display device 28 positioned between the collimator lens 25 and the projective lens 26 and also provided with a shutter mechanism 29 positioned in front of the hologram recording medium 3. Hologram element images are sequentially displayed on the transmission type liquid crystal display device 28, based on the hologram element image data D5 outputted from the control computer 13. Also, the shutter mechanism 29 comprises a strip-like shutter piece since strip-like hologram elements are recorded on the hologram recording medium 3 although specifications thereof will be omitted herefrom. The shutter mechanism 29 is operated to open and close by a control output S1 outputted from the control computer 13 in correspondence with the output timing of the hologram element image data D5, thereby to make the objective laser beam L2 enter into the hologram recording medium 3 and shuts off entrance of the objective laser beam L2 into the hologram recording medium 3.

Note that the control computer 13 sends a drive output S2 to the recording medium feed mechanism 30 of the hologram recording medium 3 in correspondence with the output timing of the hologram element image data D5, and thus performs operation control of the feed roller 31 and the wind roller 32, thereby to control the feeding operation of the hologram recording medium 3.

In the objective laser optical system 15B constructed as described above, the objective laser beam L2 in a point light source state, which is spectrally divided from the incidence laser optical system 15A and is let into, is changed into a diffused laser beam by the first cylindrical lens 24, and is also let into the collimator lens 25 where the beam is parallelized. The objective laser optical system 15B image-modulates the objective laser beam L2 which has been let into the transmission type liquid crystal display device 28 through the collimator lens 25 and also lets the objective laser beam L2 enter into the second cylindrical lens 27 through the projective lens 26. The objective laser optical system 15B makes the image-modulated objective laser beam L2 enter into the hologram recording medium 3 and exposes this medium while the shutter mechanism 29 is opened in accordance with the hologram element image.

Meanwhile, the optical system 15C for the reference laser beam L3 is specifically comprised of a cylindrical lens 33, a collimator lens 34, and a total-reflection mirror 35, which are arranged orderly along the optical axis from its input side. The cylindrical lens 33 is constructed by combining a convex lens and a pin hole, like the first cylindrical lens 24 of the objective laser optical system 15B described above, and diffuses a reference laser beam L3 which has been refracted and spectrally divided by the half-mirror 22, in a one-dimensional direction corresponding to the display screen width of the liquid crystal display device 28. The collimator lens 34 parallelizes the reference laser beam L3 diffused by the cylindrical lens 33. The total-reflection mirror 35 refracts and reflects the reference laser beam L3 and thus guides this beam so as to enter into the back side of the hologram recording medium 3.

Also, the reference laser optical system 15C is provided with a shutter mechanism which is opposed to the shutter mechanism 29 of the objective laser optical system 15B described above and is positioned behind the hologram recording medium 3. The shutter mechanism 36 comprises a strip-like shutter piece like the shutter piece of the shutter mechanism 29, and this shutter piece is operated to open and close in synchronization with the shutter mechanism 29 of the objective laser optical system 15B by a control output S1 outputted from the control computer 13 in correspondence with an output timing of hologram element image data D5. Through this opening and closing operation, the shutter mechanism 36 makes the reference laser beam L3 enter into the hologram recording medium 3 and shuts off the incidence of the reference laser beam L3.

The reference laser optical system 15C lets the reference laser beam L3 enter into the hologram recording medium 3 while the shutter mechanism 36 is opened. Since the reference laser optical system 15C is operated to open and close in synchronization with the shutter mechanism 29 of the optical system for the objective laser beam L2, interference fringes between the reference laser beam L3 and the objective laser beam L2 are recorded onto the hologram recording medium 3 in correspondence with the hologram element image as will be described later in more details. The shutter mechanisms 29 and 36 each may have a structure in which a shutter piece is mechanically driven or which is based on an electronic shutter using an acousto-optic modulation (AOM) device. In brief, these shutter mechanisms 29 and 36 each may be a mechanism which is capable of shutting off the objective laser beam L2 or the reference laser beam L3 and which can open and close.

In the optical system 15 constructed as described above, the objective laser beam L2 and the reference laser beam L3 emitted from the laser light source 21 and spectrally divided by the half-mirror 22 are always let into the objective laser beam optical system 15B and the reference laser beam optical system 15C and are also let into the hologram recording medium 3 by opening operations of the shutter mechanisms 29 and 36. Therefore, the optical system 15 is constructed in a structure in which thermal deformation of each optical component is prevented compared with the case in which the incidence laser beam L1 is emitted in accordance with recording operation, for example. As a result, in the optical system 15, respective optical components are kept in a stable condition and stable objective and reference laser beams L2 and L3 are let into the hologram recording medium 3. Therefore, excellent interference fringes are exposed and formed on the hologram recording medium 3, thereby forming a bright holographic stereogram with an excellent diffraction factor.

Also, the optical system 15 is constructed such that the optical systems for the objective laser beam L2 and the reference laser beam L3 spectrally divided by the half-mirror 22 have a substantially equal light path length. Accordingly, the coherence between the objective laser beam L2 and the reference laser beam L3 is improved so that the optical system 15 prepares a holographic stereogram from which a much clearer reproduced image is obtained.

The optical system 15 further comprises an interference fringe detector section 37 which stops exposure recording on the hologram recording medium 3 if there is a possibility that no excellent holographic stereogram of an excellent state cannot be prepared due to a vibration or the like. The interference fringe detector section 37 detects the state of interference fringes exposed and formed by each of the objective laser beam L2 and the reference laser beam L3 through the optical system described above. The interference fringe detector section 37 is constructed, for example, by a CCD camera (Charge Coupled Device camera), and detects a shaking state of the interference fringes exposed and formed on a detection region of the hologram recording medium 3 which is different from the formation area where a holographic stereogram is formed, in the wavelength order of the incidence laser beam L1 emitted from the laser light source 21.

When appearance of interference fringes in a shaking state of a predetermined value or more is detected within a detection area, the interference fringe detector section 37 sends a detection output to the control computer 13. The control computer 13 renders each of the shutter mechanisms 29 and 36 nonoperational based on the detection output.

Accordingly, on the hologram recording medium 3, preparation of a holographic stereogram is stopped since incidence of the objective laser beam L2 and the reference laser beam L3 is shut off. In addition, the interference fringe detector section 37 stops sending of the detection output to the control computer 13 when interference fringes formed in the detection area are brought into a shaking state of a predetermined value or more. In this manner, the control computer 13 renders each of the shutter mechanisms 29 and 36 operational so that the objective laser beam L2 and the reference laser beam L3 are let into the hologram recording medium 3 and a holographic stereogram is thus prepared.

Thus, since the holographic stereogram preparation apparatus comprises an interference fringe detector section 37, a holographic stereogram is exposed and recorded onto a hologram recording medium 3 while interference fringes based on the objective laser beam L2 and the reference laser beam L3 are kept in a stable state, so that a bright holographic stereogram having a high refraction factor is prepared. Also, since the holographic stereogram preparation apparatus 10 comprises the interference fringe detector section 37, the installation location thereof is not limited but the operationality is improved.

Although the interference fringe detector section 37 is provided in the vicinity of the hologram recording medium 3 and is constructed so as to form a part of interference fringes exposed and formed within the detection area, the section 37 is not limited to this construction. For example, the interference fringe detector section 37 may be constructed such that the parts of the objective laserbeam L2 and the reference laser beam L3 are guided to another position to form interference fringes with use of a mirror or the like and these interference fringes are detected. Further, the interference fringe detector section 37 may be arranged so as to extract a part of an incidence laser beam L1 emitted from the laser light source 21 to form interference fringes for detecting a vibration. Also, another optical system for detecting a vibration apart from the optical system 15 may be provided as the interference fringe detector section 37, and may be constructed such that interference fringes based on this optical system are detected to detect a vibration.

As described above, the holographic stereogram preparation apparatus 10 comprises a recording medium feed mechanism 30 which intermittently feeds the hologram recording medium 3 by a distance equivalent to one hologram element. Based on a drive output S2 sent from the control computer 13, the feed roller 31 and the wind roller 32 are operated to rotate linked with each other and drive intermittently the hologram recording medium 3. In addition, linked with the operation of the recording medium feed mechanism 30 and based on a control output S1 sent from the control computer 13, the shutter mechanism 29 in the objective laser optical system 15B side and the shutter mechanism 36 in the reference laser optical system 15C side are operated respectively to open their own light paths, in the holographic stereogram preparation apparatus 10.

As shown in FIGS. 6 and 7, the recording medium feed mechanism 30 is comprised of a feed roller which is rotatably provided in a film cartridge 38 and around which a hologram recording medium 3, a wind roller 32 by which the hologram recording medium 3 fed from the film cartridge 38 is made to intermittently travel, a torsion spring not shown which applies a predetermined traveling tension to the hologram recording medium 3, and the like. The recording medium feed mechanism 30 supports the hologram recording medium 3 by means of the feed roller 31 and the wind roller 32, as shown in FIG. 7, such that its photosensitive surface is vertical to each of the optical axes of the objective laser optical system 15B and the reference laser optical system 15C.

In the recording medium feed mechanism 30, the wind roller 32 is driven to rotate intermittently by a stepping motor not shown for driving. The stepping motor is driven and rotated by a predetermined angle corresponding to one hologram element every time exposure for one image is finished, by a drive output S2 sent from the control computer 13 of the control section 12. Accordingly, the hologram recording medium 3 is intermittently driven to travel a distance equivalent to one hologram element for every exposure of one image, by the wind roller driven and rotated by the stepping motor, and thus, a holographic stereogram based on interference fringes of the objective laser beam L2 and the reference laser beam L3 is exposed and recorded.

As shown in FIG. 6, the holographic stereogram preparation apparatus 10 is provided with an ultraviolet lamp 39, positioned in the rear stage of the recording medium feed mechanism 30, along the traveling path of the hologram recording medium 3. The ultraviolet lamp 39 completes polymerization of monomers M in matrix polymer by irradiating ultraviolet rays with a power of 1000 mJ/cm$^2$ or so onto the hologram recording medium 3 where the holographic stereogram based on the interference fringes of the objective laser beam L2 and the reference laser beam L3 is exposed and recorded.

Also, the holographic stereogram preparation apparatus 10 is provided with a heat roller 40, a pair of feed-out rollers 41 and 42, and a cutter 43 which are positioned in the rear stage of the ultraviolet lamp 39. The heat roller 40 hangs the hologram recording medium 3 on the outer circumferential portion thereof with a winding angle approximately equivalent to the half of the circumference of the roller. In addition, the heat roller 40 internally comprises a heater which is omitted from the figure and is maintained at a temperature of about 120° C., so that the hologram recording medium 3 is heated to increase the modulation factor of the refraction factor.

The feed-out rollers 41 and 42 are rotated and driven by a stepping motor not shown which is driven by a drive output S2 sent from the control computer 13 of the control section 12. Also, the feed-out rollers 41 and 42 are rotated and driven in synchronization with the wind roller 32 of the recording medium feed mechanism 30, thereby intermittently feeding the hologram recording medium 3 so as to correspond to one hologram element every time exposure for one image is finished. Therefore, the hologram recording medium 3 travels in tight contact with the outer circumferential portion of the heat roller 40 between these rollers and the wind roller 32 by the feed-out rollers 41 and 42 without deformation.

The cutter 43 is driven by the drive output S2 sent from the control computer 12 and cuts the traveling hologram recording medium 3 at a constant length, i.e., in a state where a holographic stereogram based on image data pieces of a parallax image sequence has all been exposed and recorded onto the hologram recording medium 3 and the recording portion thereof has been fed outsides.

The recording medium feed mechanism is additionally provided with a hold mechanism which holds the hologram recording medium 3 while each of the hologram elements based on interference fringes of the objective laser beam L2 and the reference laser beam L3 is exposed and formed on the hologram recording medium 3. As shown in FIG. 7, the hold mechanism 44 is provided and positioned between the feed roller 31 and the wind roller 32 which form part of an exposing/recording section for the hologram recording medium 3. The hold mechanism is curved and formed with curvatures substantially equal to each other and consists of a one-dimensional diffusion plate 45 and a louver film 46 which are integrally bonded to each other. The hold mechanism 44 is bought into contact with and is separated from the hologram recording medium 3 by a drive mechanism not shown.

The one-dimensional diffusion plate 45 operates to diffuse the entering objective laser beam L2 in the longitudinal direction, i.e., in the longer axis direction of each hologram element to be prepared, so that a view angle in the longitudinal direction is applied to the holographic stereogram. Also, the louver film 46 is an optical component having a fine grid like a bamboo blind and prevents the reference laser beam L3, which has been transmitted through the hologram recording medium 3, from being reflected by the one-dimensional diffusion plate 45 and entering again into the hologram recording medium 3 thereby recording incorrect interference fringes.

While interference fringes are exposed and recorded on the hologram recording medium 3, the hold mechanism 44 presses and holds the hologram recording medium 3 by means of a drive mechanism not shown. The hold mechanism 44 functions to exclude influences from fine small vibrations of the wavelength order or so of the laser beam L1, which are applied while interference fringes of the objective laser beam L2 and the reference laser beam L3 are exposed and recorded, and to rapidly and stably stop the hologram recording medium 3 which has been let to travel, so that interference fringes can be exposed and recorded. Accordingly, stable interference fringes of the objective laser beam L2 and the reference laser beam L3 can be exposed and recorded on the hologram recording medium 3, and the holographic stereogram preparation apparatus 10 can hence prepare a holographic stereogram with a high diffraction efficiency.

As shown in FIGS. 4, 8, and 9, the holographic stereogram preparation apparatus 10 is constructed by mounting component members and parts of the optical system 15 described above on a support board (optical surface plate) 18 formed of an aluminum plate, an aluminum alloy plate, or the like. The holographic stereogram preparation apparatus 10 causes a phenomenon wherein excellent interference fringes are not exposed and formed on the hologram recording medium 3 since the objective laser beam L2 and the reference laser beam L3 do not enter stably into the hologram recording medium 3 in a case where a vibration or the like is applied. Therefore, the holographic stereogram preparation apparatus 10 supports the support board 18 by means of a plurality of dampers 19 in order to reduce influences such as vibrations and the like on the optical system 15 and the like.

For example, each of the dampers 19 is constructed by an elastic member such as an air spring, a rubber or coil spring, or the like although specifications thereof will be omitted herefrom. An end portion of the damper is combined with the support board 18 thereby holding the support board 18, and the other end portion is fixed to a base member 20A of the apparatus casing 20. These dampers 19 function to reduce vibrations and the like applied to the optical system 15 to the wavelength (about 1 μm) of the objective laser beam L2 and the reference laser beam L3 or less, or more preferably to ⅕ or less. Therefore, in the holographic stereogram preparation apparatus 10, the optical system 15 is held stably even in a case where a vibration or the like is applied from the outside, and hence, the objective laser beam L2 and the reference laser beam L3 are let stably into the hologram recording medium 3 without being shaken. In this manner, the holographic stereogram preparation apparatus 10 enables preparation of a bright holographic stereogram with an excellent diffraction efficiency.

Meanwhile, in the holographic stereogram preparation apparatus 10, a semiconductor excitation YAG laser device, an air-cooled argon gas laser device, an air-cooled krypton laser device, or the like is used as a laser light source 21 which emits the objective laser beam L2 and the reference laser beam L3, as described above. The laser light source 21 is additionally provided with a cooling means consisting of a heat sink member 47 and the like whose specifications will be omitted herefrom, as shown in FIGS. 8 and 9, since the laser head section is heated to a high temperature which increases the temperature inside the apparatus. Further, the holographic stereogram preparation apparatus 10 is additionally provided with a cooling device to cool the heat sink member 47.

The cooling device is comprised of a ventilation fan 48 and an exhaust fan 49, a ventilation duct 50 and an exhaust duct 51, a connection duct 52, and the like which are attached to the apparatus casing 20. The ventilation fan 48 is incorporated in an attachment hole provided in the apparatus casing 20 and is constructed by a fan rotatably supported on a cylindrical casing and a motor or the like which rotates this fan, although specifications thereof will be omitted herefrom. The ventilation fan 48 takes in outside air into the inside of the apparatus casing 20 by means of rotation of the fan. Likewise, the exhaust fan 49 is incorporated in an attachment hole provided in the apparatus casing 20 and is constructed by a fan rotatably supported on a cylindrical casing and a motor or the like which rotates this fan, although specifications thereof will be omitted herefrom. The exhaust fan 49 discharges air, which has come to have a high temperature, to the outside from the apparatus casing 20.

Each of the ventilation duct 50, the exhaust duct 51, and the connection duct 52 are formed of a bellows-like rubber pipe material, for example. An end portion of the ventilation duct 50 is connected to the ventilation fan 48 and the other end portion is faced to the laser head section of the laser light source 21. The connection duct 52 is connected between the laser head section of the laser light source 21 and the heat sink member 47. An end portion of the exhaust duct 51 is connected to the exhaust fan 49 and the other end portion thereof is connected to the heat sink member 47. Note that these ventilation duct 50, exhaust duct 51, and connection duct 52 are not limited to bellows-like rubber pipe members but are formed of a non-rigid material such as a synthetic resin or the like which has an elasticity in order to restrict transfer of vibrations and the like.

In the holographic stereogram preparation apparatus 10, a cooling circuit is formed by a so-called close loop so that convection of air might not be caused in the apparatus casing 20 by the ventilation fan 48 and the exhaust fan 49 thereby floating dust and the like. That is, the cooling circuit is comprised of the ventilation fan 48, the ventilation duct 50, the laser light source 21, the connection duct 52, the heat sink member 47, the exhaust duct 51, and the exhaust fan 49. If the dust and the like convecting in the apparatus casing 20 enter into the optical system 15, the dust and the like become factors which render the objective laser beam L2 and the reference laser beam L3 unstable and shake interference fringes to damage the uniformness. Therefore, since the holographic stereogram preparation apparatus 10 comprises a cooling circuit consisting of a close loop, convection of dust and the like is restricted, air taken in is efficiently fed to the heat sink member 47 thereby cooling this member, and heat-exchanged air is exhausted to the outside. Hence, the cooling efficiency is improved.

Meanwhile, the ventilation fan 48 and the exhaust fan 49 cause vibrations due to rotation of the fans and thus become internal vibration sources in the holographic stereogram preparation apparatus 10. When influences of vibrations on the optical system 15 in a operating state were measured by a laser Doppler vibration meter in a conventional holographic stereogram printer apparatus, the ventilation fan 48 and exhaust fan 49 reached a level of 10 $\mu$m (p-p).

Of course, since the holographic stereogram preparation apparatus 10 uses the hologram recording medium 3 as a photosensitive material as described above, the ventilation fan 48 and the exhaust fan 49 are attached to the apparatus casing 20 constructed with a light shielding characteristic, while maintaining the light shielding characteristic.

The holographic stereograin preparations apparatus 10 is constructed in a structure in which the ventilation fan 48 and the exhaust fan 49 are provided in the apparatus casing 20, as described above, and the support board 18 which supports component members and the like of the optical system 15 is supported on the base member 20A of the apparatus casing 20 through the dampers 19. In other words, in the holographic stereogram preparation apparatus 10, the optical system 15 is supported on the apparatus casing 20 such that transfer of vibrations through the dampers 19 is restricted by the damper 19, with respect to the ventilation fan 48 and the exhaust fan 49 as internal vibration sources. In the holographic stereogram preparation apparatus 10, when influences of vibrations on the optical system 15 in an operating state of the ventilation fan 48 and the exhaust fan 49 were measured by a laser Doppler vibration meter, the influences were reduced to a level of 0.1 $\mu$m (p-p).

Accordingly, in the holographic stereogram preparation apparatus 10, vibrations and the like applied from the outside are absorbed by the dampers 19, and vibrations and the like generated by the ventilation fan 48 and the exhaust fan 49 which are provided to cool the laser light source 21 do not directly influence the optical system. In the holographic stereogram preparation apparatus 10, vibrations and the like are kept reduced to ⅕ of the wavelength of the laser beam L1, and the objective laser beam L2 and the reference laser beam L3 are let into the hologram recording medium 3. Therefore, interference fringes based on the objective laser beam L2 and the reference laser beam L3 are stabilized so that precise exposing/recording of hologram elements onto the hologram recording medium 3 is enabled and a bright holographic stereogram is prepared with a high diffraction efficiency.

Explanation will now be made of an operation for preparing a holographic stereogram based on the holographic stereogram preparation apparatus 10 constructed as described above. In the holographic stereogram, image data D5 is supplied from the image data processing section 11 to the control section 12, and a control output S1 and a drive output S2 are supplied to each section from the control computer 12. Also, corresponding hologram elements are sequentially displayed on the transmission type liquid crystal display device 28, based on the hologram element image data D5. Meanwhile, in the holographic stereogram preparation apparatus 10, an incidence laser beam L1 is emitted from the laser light source 21, and this incidence laser beam L1 is spectrally divided into an objective laserbeam L2 and a reference laserbeam L3 which are respectively guided to the objective laser optical system 15B and the reference laser optical system 15C.

In the holographic stereogram preparation apparatus 10, by a drive output S2 sent from the control computer 12, the shutter mechanisms 29 and 36 are each operated to open for a period required for exposure of one hologram element image displayed on the transmission type liquid crystal display device 28, so that the objective laser beam L2 and the reference laser beam L3 are let into the hologram recording medium 3 thereby exposing this medium. The objective laser beam L2 image-modulated when being transmitted through the transmission type liquid crystal display device 28 is let into the hologram recording medium 3. Interference fringes based on the objective laser beam L2 and the reference laser beam L3 image-modulated in correspondence with a hologram element image are exposed and recorded onto the hologram recording medium 3.

Also, in the holographic stereogram preparation apparatus 10, when a vibration of a predetermined value or more is detected by the interference fringe detector section 37, the shutter mechanisms 29 and 36 are each closed by a drive output S2 sent from the control computer 12, so that exposing/recording of a hologram element image on the hologram recording medium 3 is not performed. In the holographic stereogram preparation apparatus 10, when exposing/recording of a hologram element image is performed on the hologram recording medium 3 after a predetermined time has passed, the shutter mechanisms 29 and 36 are each closed by a drive output S2 sent from the control computer 12 so that the objective laser beam L2 and the reference laser beam L3 are not let into the hologram recording medium 3. Thereafter, in the holographic stereogram preparation apparatus 10, the recording medium feed mechanism 30 is driven by a drive output S2 sent from the control computer 12, and the hologram recording medium 3 is allowed to travel a predetermined amount.

In the holographic stereogram preparation apparatus 10, the same operation as described above is performed, based on the next hologram element image data D5 supplied from the image data processing section 11, and a hologram element corresponding to this hologram element image data D5 is exposed and recorded on the hologram recording medium 3. The holographic stereogram preparation apparatus 10 irradiates ultraviolet rays LB onto the hologram recording medium 3 where a hologram element is exposed and recorded, by means of the ultraviolet lamp 39, thereby to fix the hologram element. The holographic stereograin preparation apparatus 10 sequentially repeats the above-described operation thereafter. When all of a holographic stereogram consisting of strip-like hologram elements consecutive in the lateral direction is exposed and recorded on the basis of each of the hologram element image data pieces D5 of the parallax image sequence, the cutter 43 is driven by a drive output S2 sent from the control computer 12 and the hologram recording medium 3 is cut at a predetermined length.

Accordingly, the hologram recording medium 3 thus cut forms a holographic stereogram consisting of hologram elements which have a parallax in the lateral direction in correspondence with a parallax data sequence D3 and are sequentially exposed and recorded.

Although the holographic stereogram preparation apparatus 10 is an apparatus which exposes and records hologram element images in monochrome onto the hologram recording medium 3, the present invention is not limited to this holographic stereogram preparation apparatus. The holographic stereogram preparation apparatus may be an apparatus which exposes and records synthesized hologram element images in color, for example, by comprising laser light sources for three primary colors of red, green, and blue as well as optical systems and liquid crystal display devices corresponding to the laser light sources.

Also, the holographic stereogram preparation apparatus 10 exposes and records a holographic stereogram having information of parallax only in the lateral direction (so-called Horizontal Parallax Only). However, the present invention is naturally applicable to a holographic stereogram having information of parallax in both the lateral and longitudinal directions (so-called Full Parallax). In this holographic stereogram preparation apparatus, the objective laser beam L2 and the reference laser beam L3 are converged in a dot-like form in place of a strip-like form, and the hologram recording medium 3 is two-dimensionally moved in relation to the beam convergence position to perform exposure on the entire surface. Also, shutters each having a circular opening portion are used for this holographic stereogram preparation apparatus. Further, the holographic stereogram preparation apparatus may be provided with independent cooling means for the laser light sources, respectively, and a ventilation duct 50 and an exhaust duct 51 may be respectively branched and connected from the ventilation fan 48 and the exhaust fan 49.

Although the ventilation fan 48 and the exhaust fan 49 are constructed so as to cool the laser light source 21 in a state where a laser beam L1 is emitted from the laser light source 21, by connecting their power switches in common to the power switch of the laser light source 21, these fans may be controlled independently. Further, the ventilation fan 48 and the exhaust fan 49 may be constructed such that the power source is turned on to perform cooling when the laser light source 21 comes to have a predetermined temperature or more by additionally providing a thermostat switch for the laser light source 21.

What is claimed is:

1. A holographic stereogram preparation apparatus comprising:
   an optical system, said optical system including a light source, an interference fringe detector, and a recording medium,
      said interference fringe detector detecting vibration and generating a detection output, said detection output being capable of halting recording on said recording medium;
   a cooling member, said cooling member cooling said optical system, said cooling member including a heat sink member adjacent said optical system, said heat sink member supporting a portion of said optical system and removing heat from said optical system, said cooling member cooling said heat sink member, said cooling member including:
      a ventilation fan adjacent an apparatus casing;
      a ventilation duct connected to said ventilation fan, said ventilation duct channeling a cooling substance between said light source and said ventilation fan;
      a connection duct, said connection duct channeling said cooling substance between said light source and said heat sink member;
      an exhaust fan adjacent said apparatus casing; and
      an exhaust duct connected to said exhaust fan, said exhaust duct channeling said cooling substance between said heat sink member and said exhaust fan;
   a support board adjacent said heat sink member, said support board supporting said portion of said optical system and said heat sink member;
   at least one damper, said at least one damper reducing said vibration to said optical system; and
   said apparatus casing containing said optical system, said cooling member, said at least one damper, and said support board.

2. A holographic stereogram preparation apparatus of claim 1, wherein said optical system includes an image modulation device,
   said light source being adapted to emit a light beam,
   said image modulation device modulating said light beam to produce a modulated light beam,
   said recording medium recording said modulated light beam.

3. A holographic stereogram preparation apparatus of claim 2, wherein said light source generates a laser beam is subjected to image-modulation based on each image of a parallax image sequence, and a reference laser beam has coherence with respect to said laser beam,
   said optical system permitting said laser beam and said reference laser beam to enter into said recording medium,
   said optical system recording an interference fringe onto said recording medium as a hologram element, said interference fringe being generated by said laser beam and said reference laser beam,
   said interference fringe detector detecting a shaking state of said interference fringe to detect said vibration.

4. A holographic stereogram preparation apparatus of claim 1, wherein:
   said support board is on said at least one damper;
   said heat sink member is on said support board; and
   said optical system is on said heat sink member.

5. A holographic stereogram preparation apparatus of claim 1, wherein said at least one damper insulates said optical system from said vibration present at said apparatus casing.

6. A holographic stereogram preparation apparatus of claim 1, wherein said at least one damper comprises a plurality of dampers.

7. A holographic stereogram preparation apparatus of claim 1, wherein said at least one damper supports said optical system, said heat sink member, and said support board.

8. A holographic stereogram preparation apparatus of claim 1, wherein said apparatus casing is an enclosed container, said enclosed container encasing said at least one damper, said support board, said heat sink member, and said optical system.

9. A holographic stereogram preparation apparatus of claim 1, wherein said at least one damper supports said optical system on said apparatus casing while inhibiting said vibration.

10. A holographic stereogram preparation apparatus of claim 1, wherein said light source generates a laser beam is subjected to image-modulation based on each image of a parallax image sequence, and a reference laser beam has coherence with respect to said laser beam,
    said optical system permitting said laser beam and said reference laser beam to enter into said recording medium,
    said optical system recording an interference fringe onto said recording medium as a hologram element, said interference fringe being generated by said laser beam and said reference laser beam.

11. A holographic stereogram preparation apparatus of claim 1, wherein a portion of said optical system is encased within an optical system enclosure.

12. A holographic stereogram preparation apparatus of claim 1, further comprising:
said light source on said support board.

13. A holographic stereogram preparation apparatus of claim 1, wherein said optical system records a hologram element in cooperation with said light source.

14. A holographic stereogram preparation apparatus of claim 1, wherein said optical system:
permits entry of a laser beam and a reference laser beam generated from said light source into said recording medium; and
records, onto said recording medium as a hologram element, an interference fringe e generated by said laser beam and said reference laser beam.

15. A holographic stereogram preparation apparatus of claim 1, wherein said cooling substance between said light source and said ventilation fan, said cooling substance between said light source and said heat sink member, and said cooling substance between said heat sink member and said exhaust fan is the same cooling substance.

16. A holographic stereogram preparation apparatus of claim 1, wherein said cooling member cools said light source.

17. A holographic stereogram preparation apparatus of claim 1, wherein said ventilation duct is connected to said light source, said connection duct is connected to said light source and said heat sink member, and said exhaust duct is connected to said heat sink member.

18. A holographic stereogram preparation apparatus of claim 1, wherein said ventilation fan is incorporated into said apparatus casing, and said exhaust fan is incorporated into said apparatus casing.

19. A holographic stereogram preparation apparatus of claim 1, wherein said ventilation duct comprises a non-rigid material.

20. A holographic stereogram preparation apparatus comprising:
an optical system, said optical system including a light source, an image modulation device, and a recording medium, and an interference fringe detector,
said light source being adapted to emit a light beam,
said image modulation device modulating said light beam to produce a modulated light beam,
said recording medium recording said modulated light beam, and
said interference fringe detector detecting vibration, said interference fringe detector generating a detection output, said detection output being capable of halting recording said modulated light beam;
a heat sink member adjacent said optical system, said heat sink member supporting a portion of said optical system and removing heat from said image modulation device;
a cooling member, said cooling member cooling said heat sink member and said light source;
a support board adjacent said heat sink member, said support board supporting said portion of said optical system and said heat sink member;
a damper, said damper supporting said optical system, said heat sink member, and said support board;
an apparatus casing, said apparatus casing encasing said optical system, said cooling member, said damper, and said support board, said damper reducing said vibration to said optical system by insulating said optical system from said vibration present at said apparatus casing.

21. A holographic stereogram preparation apparatus of claim 20, wherein said cooling member includes:

a ventilation fan adjacent said apparatus casing;
a ventilation duct connected to said ventilation fan, said ventilation duct channeling a cooling substance between said heat sink member and said ventilation fan;
an exhaust fan adjacent said apparatus casing; and
an exhaust duct connected to said exhaust fan, said exhaust duct channeling said cooling substance between said heat sink member and said exhaust fan.

22. A holographic stereogram preparation apparatus of claim 21, wherein said ventilation fan is incorporated into said apparatus casing, and said exhaust fan is incorporated into said apparatus casing.

23. A holographic stereogram preparation apparatus of claim 21, wherein at least one of said ventilation duct and said exhaust fan comprise a non-rigid material.

24. A holographic stereogram preparation apparatus comprising:
an optical system, said optical system including a light source and an interference fringe detector,
said interference fringe detector detecting a vibration and generating a detection output, said detection output being capable of halting recording on a recording medium;
a cooling member, said cooling member cooling said optical system, said cooling member including a heat sink member adjacent said optical system and a connection duct,
said heat sink member supporting a portion of said optical system and removing heat from said optical system, said cooling member cooling said heat sink member,
said connection duct channeling a cooling substance between said light source and said heat sink member;
a support board adjacent said heat sink member, said support board supporting said portion of said optical system and said heat sink member;
at least one damper, said at least one damper reducing said vibration to said optical system; and
said apparatus casing containing said optical system, said cooling member, said at least one damper, and said support board.

25. A holographic stereogram preparation apparatus of claim 24, wherein said cooling member further comprises:
a ventilation duct and an exhaust duct,
said ventilation duct channeling said cooling substance between said light source and said apparatus casing;
said exhaust duct channeling said cooling substance between said heat sink member and said apparatus casing.

26. A holographic stereogram preparation apparatus of claim 25, wherein:
said ventilation duct is connected to said light source;
said connection duct is connected between said light source and said heat sink member;
said exhaust duct is connected to said heat sink member.

27. A holographic stereogram preparation apparatus of claim 26, wherein:
said ventilation duct connected to a ventilation fan and said ventilation fan is connected to said apparatus casing;
said exhaust duct connected to an exhaust fan and said exhaust fan is connected to said apparatus casing.

* * * * *